United States Patent [19]

Kopineck et al.

[11] 4,382,374
[45] May 10, 1983

[54] METHOD OF, AND APPARATUS FOR, EFFECTING TEMPERATURE-EQUALIZATION OF HOT STEEL STRIP

[75] Inventors: Hermann-Josef Kopineck; Wilhelm Tappe; Wolfgang Fabian, all of Dortmund, Fed. Rep. of Germany

[73] Assignee: Hoesch Werke AG, Dortmund, Fed. Rep. of Germany

[21] Appl. No.: 232,914

[22] Filed: Feb. 9, 1981

[30] Foreign Application Priority Data

Jan. 18, 1980 [DE] Fed. Rep. of Germany ....... 3001684

[51] Int. Cl.³ .............................................. B21B 45/00
[52] U.S. Cl. ................................................... 72/202
[58] Field of Search ........................ 72/200, 202, 364; 148/12 R; 266/102

[56] References Cited

U.S. PATENT DOCUMENTS

| 1,676,176 | 7/1928 | Biggert | 72/202 |
| 3,264,856 | 8/1966 | Layard | 72/202 |
| 3,344,648 | 10/1967 | Gray | 72/202 |

FOREIGN PATENT DOCUMENTS

| 1416688 | 9/1965 | France | 72/202 |
| 45-415 | 1/1970 | Japan | 72/202 |
| 54-146255 | 11/1979 | Japan | 72/202 |

Primary Examiner—Ervin M. Combs
Attorney, Agent, or Firm—Max Fogiel

[57] ABSTRACT

A method and an apparatus are disclosed for equalizing the temperature of hot steel strip traveling from a preliminary rolling mill to a final rolling mill, equalization to be effected both lengthwise and transversely of the steel strip. To achieve this purpose the lateral edge portions of the steel strip are partially covered by heat reflectors which are spaced from and adjustable relative to them.

13 Claims, 5 Drawing Figures

METHOD OF, AND APPARATUS FOR, EFFECTING TEMPERATURE-EQUALIZATION OF HOT STEEL STRIP

BACKGROUND OF THE INVENTION

The present invention relates to the processing of hot steel strip in rolling mills. More particularly, the invention relates to a method of equalizing the temperature of hot steel strip, and to an apparatus for carrying out this method.

Modern technology makes increasingly stringent requirements with respect to the uniformity of quality and characteristics of rolled steel strip, particularly wide steel strip. This uniformity is to apply both with reference to the width of the strip and with reference to the length of the strip. To meet these requirements it is necessary to take corrective action as early as possible in the manufacturing process. Thus, one step which is taken in the making of the steel is the increased use of continuous coating. Other steps can be taken in the rolling mill in which the billets are first passed through a preliminary mill where they undergo a first deformation by approximately 60–80%. The thus coarsely rolled hot steel strip (this entire disclosure is, of course, directed to hot rolling) is then advanced via a roller conveyor to the final rolling mill. The steel strip enters into the final rolling mill relatively slowly which means that all those portions of the hot steel strip which remain on the roller conveyor awaiting their turn to enter the final rolling mill, tend to cool. This cooling is extremely non-uniform over the length and width of the steel strip, a phenomenon which is of course not acceptable in light of the earlier-mentioned requirements.

It has therefore been proposed to counteract the non-uniform cooling in lengthwise direction of the strip by speeding up the final rolling process in the final rolling mill, so that the dwell time of any particular portion of strip on the roller conveyor intermediate the preliminary and final rolling mills is reduced. This has, in fact, been largely effective. Not effective, however, have been the various attempts to counteract differential cooling over the width of the strip, at least not to the extent of being both operationally and economically acceptable. One proposal suggests covering the entire roller conveyor to prevent heat loss. Such covering is, however, subjected to high thermal stresses, particularly in the center area, so that its construction is necessarily expensive and the costs involved in maintaining it fully operational are high. This makes the proposal economically not feasible.

A further proposal invisions heating the marginal portions of the steel strip on the roller conveyor by means of special heaters, in order to raise their temperature to the same temperature as the center portion of the steel strip. This, also, is economically not tenable because the world energy situation requires that energy be saved as much as possible in manufacturing processes. In terms of the treatment of hot steel strip on a roller conveyor connecting the preliminary rolling mill with the final rolling mill this means an effort to reduce heat losses, and particularly the differential heat losses from the steel strip as much as possible, since this goal—if it can be achieved—will ultimately permit a reduction of temperatures in the preliminary rolling mill.

A method and an apparatus have been proposed in German published application No. 1,452,102 which permit a control of the temperature fluctuation of hot steel strip over the length of the strip, in the area between the preliminary and final rolling mills. A control of temperature fluctuation over the width of the strip is not possible. Moreover, this proposal uses thermally insulating and thermally absorbing materials which means that there will be high thermal stressing of the system and considerable system maintenance involved.

SUMMARY OF THE INVENTION

Accordingly, it is an object of the present invention to overcome the disadvantages of the prior art.

More particularly, it is an object of the present invention to provide a method of effecting temperature equalization of hot steel strip which travels from an initial treating station (i.e. the preliminary rolling mill) to a subsequent treating station (i.e. the final rolling mill).

Another object of the invention is to provide a method of the type in question which permits such a temperature equalization in a particularly simple and economical manner, both over the length and over the width of the hot steel strip, particularly of wide hot steel strip.

A concomitant object of the invention is to provide an apparatus for carrying out the method.

In keeping with these objects, and with still others which will become apparent hereafter, one feature of the invention resides in a method of effecting temperature-equalization of hot steel strip having a center portion and lateral edge portions and traveling from an initial treating station to a subsequent treating station. Briefly stated, this method comprises the steps of advancing the hot steel strip in a predetermined path linking the stations, and partially covering the lateral edge portions of the steel strip.

An apparatus for carrying out the method may, briefly stated, comprising means for advancing the hot steel strip in the aforementioned predetermined path, and means for partially covering the lateral edge portions of the hot steel strip.

More particularly, thermal reflectors configurated as portions of a conical section, particularly of circles or ellipses, are arranged over and around the lateral edge portions of the strip in such a manner that they surround these edge portions laterally at a distance r, and that they cover the steel strip towards the center thereof by a distance of approximately r/2, and that the centers M or the focal points of the reflectors are located in the lateral regions of the steel strip. In the case of sections of ellipses the value r is the median value of the two semi-axes of the ellipses.

It is particularly advantageous if the reflectors are composed of several longitudinally extended members each of which has a planar, arcuately curved and/or elliptically curved shape in transverse direction, the members being arranged on an imaginary arc the center M of which is spaced by approximately r/4 from the edge of the steel strip towards the center of the steel strip, and that gaps exist between these members.

The members located laterally of the strip edge may be planar and a line normal to their plane may extend to the strip edge, whereas the members located upwardly of the strip edge may be of elliptical shape, but with all members again being located on an imaginary arc surrounding the center point M.

It is advantageous if the reflectors are adjustable transversely of the direction of travel of the steel strip, so that they can be adjusted for different stell strip widths. The actual width of the steel strip may be continuously or intermittently monitored by appropriate monitoring devices, such as television cameras, diode-row detectors or scanning IR detectors and the detected values may be used to automatically adjust the position of the reflectors at both lateral sides of the strip, or else manualed adjustment may be effected on the basis of these values. Of course, it is possible to adjust detectors at both sides jointly, or independently of one another.

It is also advantageous to so mount the reflectors that they can be moved upwardly and laterally away from the roller conveyor in order to facilitate access to the conveyor for maintenance purposes and in the event of malfunctions.

Longitudinally of the roller conveyor the reflectors are advantageously subdivided into a plurality of sections and in the spaces between adjacent ones of these sections the aforementioned detectors may be mounted, or else detectors which scan the steel strip for other purposes having no bearing on the present invention. The already mentioned scanning IR-detectors are currently preferred because in addition to the already mentioned functions they also make it possible to monitor the temperature across the width of the strip. Differentials of temperature between the center portion of the strip and the lateral edge portions thereof can then be used to reposition the reflectors vertically and laterally in such a manner that the heat radiation is reduced in order to decrease the temperature differentials to a value smaller than 10° C. This will generally be possible; however, in some circumstances, particularly if a type of steel is involved which must be rolled especially slowly in the final rolling mill, it may not be possible to reduce the temperature differential below this value. Against this latter eventuality the invention proposes to provide between two of the reflector groups or at the downstream end of the last of the reflector groups a heating device of any of the types known per se in the art which allows the supply of additional heat to the lateral edge portions of the steel strip so as to reduce or eliminate the undesirably high temperature differential before the steel strip enters the final rolling mill.

Finally, it is highly advantageous if the reflectors have a very low heat absorption capability and are composed of several sheet metal elements which are arranged parallel with spacing from one another and are connected with one another in a frame, the inner surfaces of these sheet metal elements which are juxtaposed with one another having a high reflection capability for thermal radiation and that one of the sheet metal elements which is closest to the hot steel strip being relatively thin.

The invention will hereafter be described with reference to exemplary embodiments which are illustrated in the appended drawing. However, these are by way of explanation only and are not to be considered limiting of the invention in any sense.

DESCRIPTION OF PREFERRED EMBODIMENTS

Figure 1:
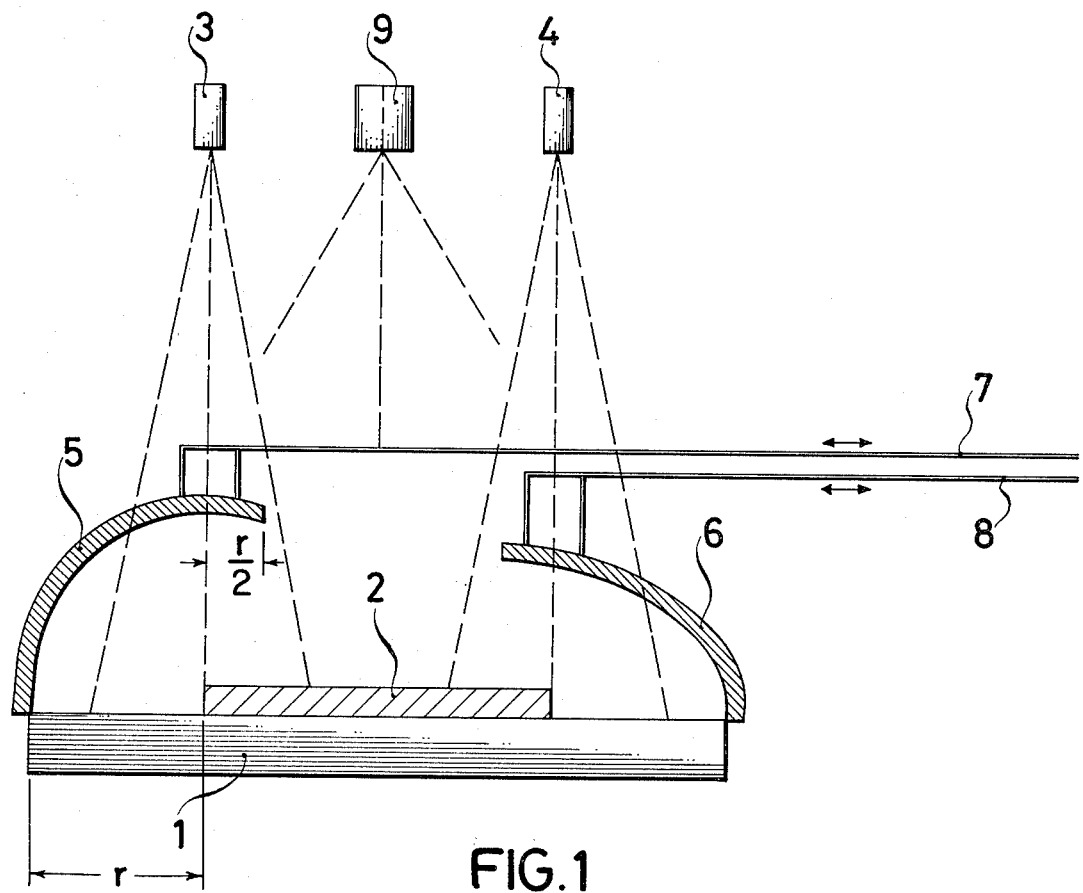
FIG. 1 is a diagrammatic illustration of an apparatus according to the present invention, in a cross section taken in a plane transverse to the direction of advancement of the hot steel strip.

Referring firstly to FIG. 1 it will be seen that reference numeral 1 identifies one of the rollers of a roller conveyor which should be understood to link a preliminary rolling mill and a final rolling mill (neither shown) and on which hot steel 2 that has been preliminarily rolled in the preliminary rolling mill is advanced to the final rolling mill in a direction normal to the plane of the figure (i.e. either towards or away from the viewer). In accordance with the invention the lateral edge portions of the steel strip 2 are partially covered by heat reflectors which, as shown for the reflectors 5, may be of circular-arc shape or, as shown for the reflector 6, of elliptical-arc shape. Of course, both types of shapes can be used along one and the same roller conveyor, or only a single shape can be used.

The lateral edges of the steel strip 2 are surrounded by the reflectors 5, 6 at a distance r and towards the center of the steel strip 2 (i.e. the mid point between the two lateral edges) the strip is covered still to the extent of approximately r/2. Diagrammatically illustrated devices 7, 8 (already known per se for shifting other elements) may be provided in order to shift the reflectors 5, 6 towards and away from the lateral edges of the steel strip 2, as indicated by the double headed arrows. They can also impart a vertical movement to the reflectors 5, 6, i.e. raise or lower them with reference to the steel strip 2. Each of the devices 7, 8 may be separately controlled so that only the reflectors 5 can be adjusted, or only the reflectors 6, or both at the same time. Detectors 3, 4 (known per se) are arranged in the gaps between longitudinally adjacent sections of the reflectors 5, 6 (the reflectors are preferably subdivided lengthwise of the roller conveyor 1 into two or more individual sections) and are positioned over the edges of the steel strip 2 so as to monitor the strip movement and/or the temperature of the strip 2 and to control the adjustment of the reflectors 5, 6 by means of the devices 7, 8 in dependence upon the information detected by the detectors 3, 4. Circuitry for linking the detectors 3, 4 with the devices 7, 8 and effecting operation of the devices 7, 8 in response to signals received from the detectors 3, 4, is already known per se. In addition to the detectors 3, 4—or in place of them—a detector 9 may be provided which is located over the center of the steel strip 2 and performs the same monitoring and control functions as the detectors 3, 4.

Figure 2:
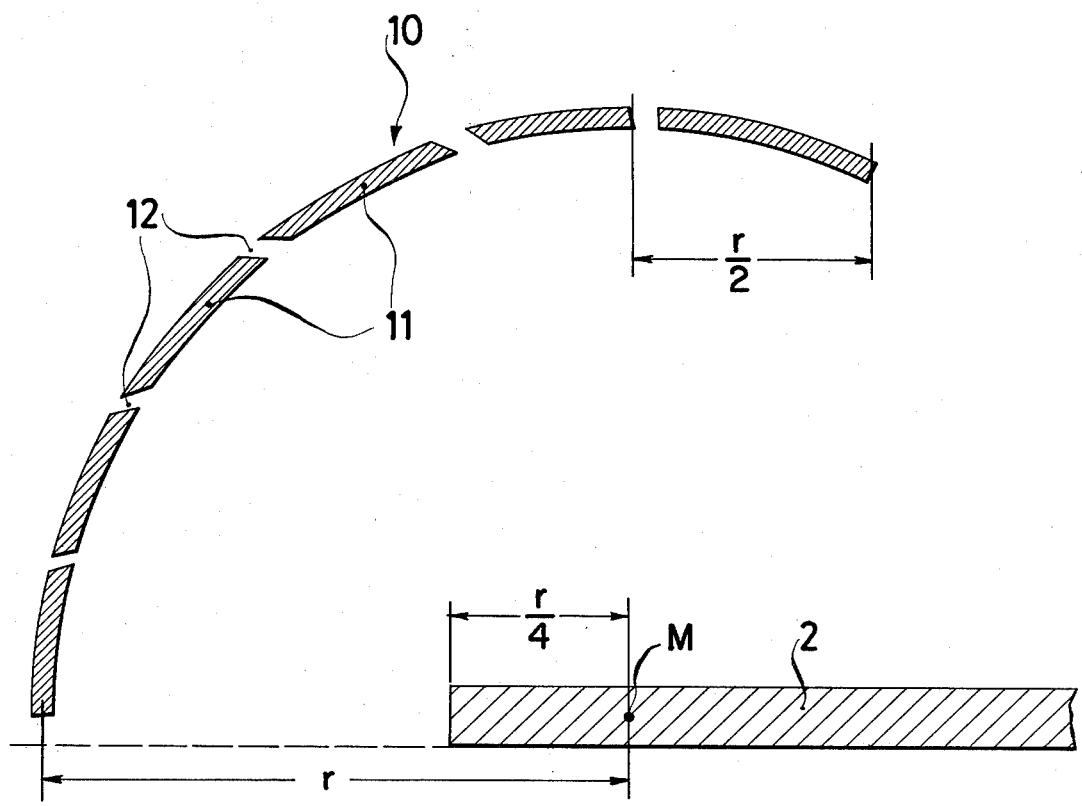
FIG. 2 is a fragmentary cross sectional view, on an enlarged scale, analagous to FIG. 1 but illustrating a further embodiment.

In the embodiment of FIG. 2 one of the reflectors is shown in detail and identified with reference numeral 10. This is of circular-arc shape and arranged over one of the lateral edges of the steel strip 2 (there will of course be another, similar or dissimilar reflector over the other lateral edge of the steel strip 2) and the reflector 10 is composed of a plurality of members 11 which extend lengthwise of the direction of strip advancement and adjacent ones of which define with one another gaps 12. The center of the circular arc is identified with reference character M and is located in the marginal region of the steel strip 2.

Figure 3:
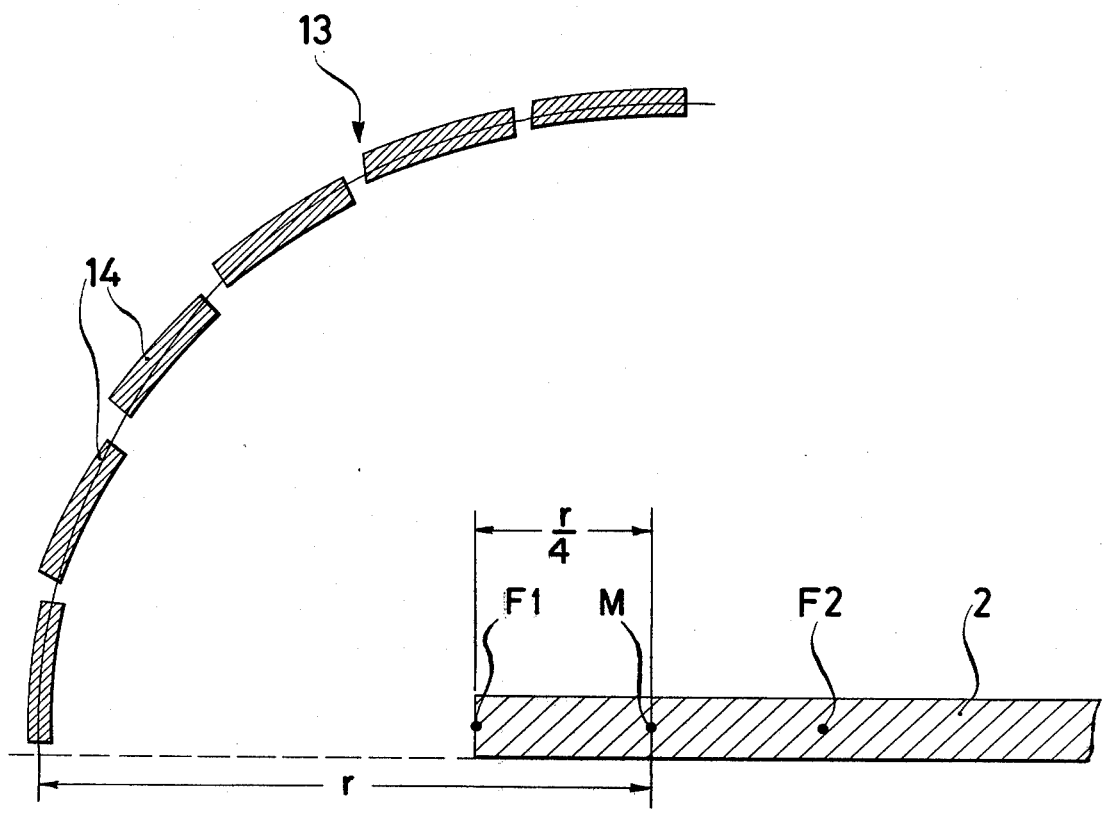
FIG. 3 is a view similar to FIG. 2 but illustrating an additional embodiment.

In the embodiment of FIG. 3 the illustrated reflector 13 is again composed of a plurality of longitudinally extending individual members, here identified with reference numeral 14. In cross section each of the members 14 is curved on an elliptical arc with the focal points F1 and F2 and all of the members 14 are located on a circular arc the center M of which is again located in the marginal region of the strip 2.

Figure 4:
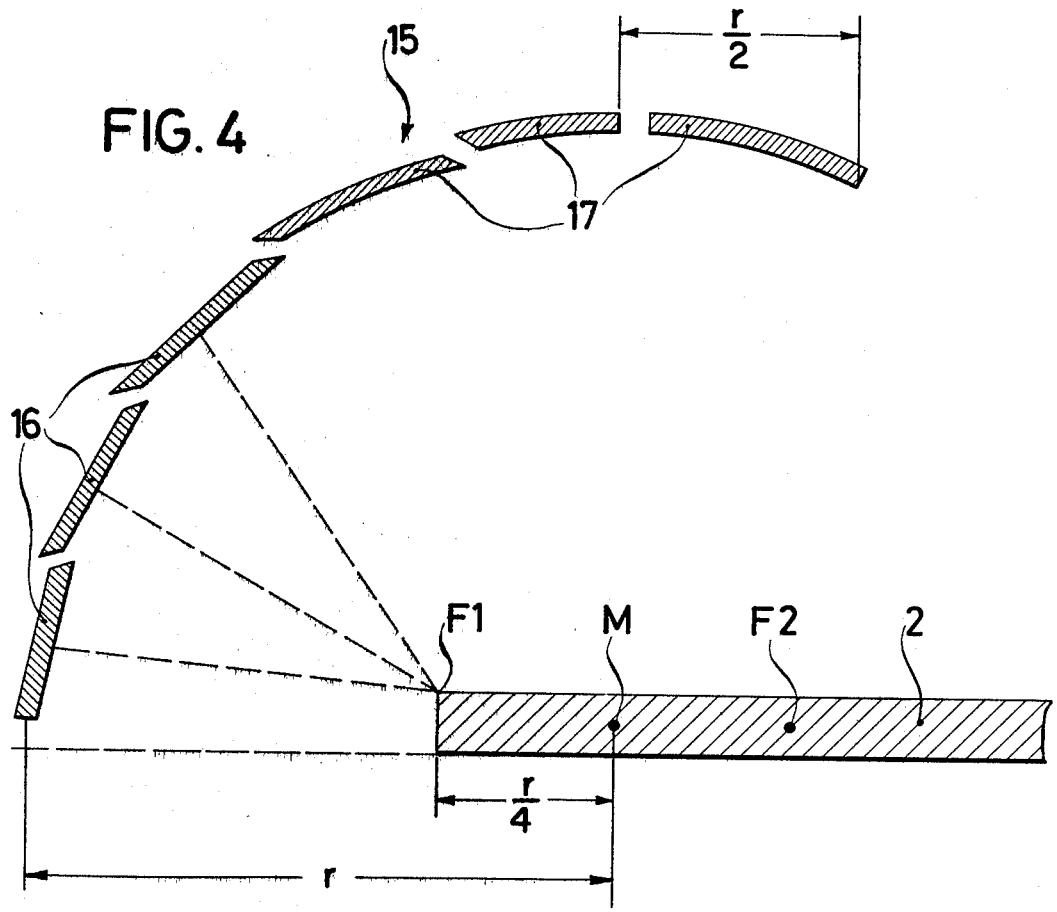
FIG. 4 is a view similar to FIG. 3, illustrating yet another embodiment.

In FIG. 4 an embodiment of a reflector 15 is shown which is composed of a plurality of longitudinally extending members 16 and 17. The members 16 are of planar configuration in transverse cross section and a line normal to them intersects the edge of the strip 2, as shown. The members 17 are in cross section curved on elliptical arcs having the focal points F1 and F2. Again, all of the members 16 and 17 are located on a circular arc having a center M which is located in the marginal region of the strip 2.

Figure 5:
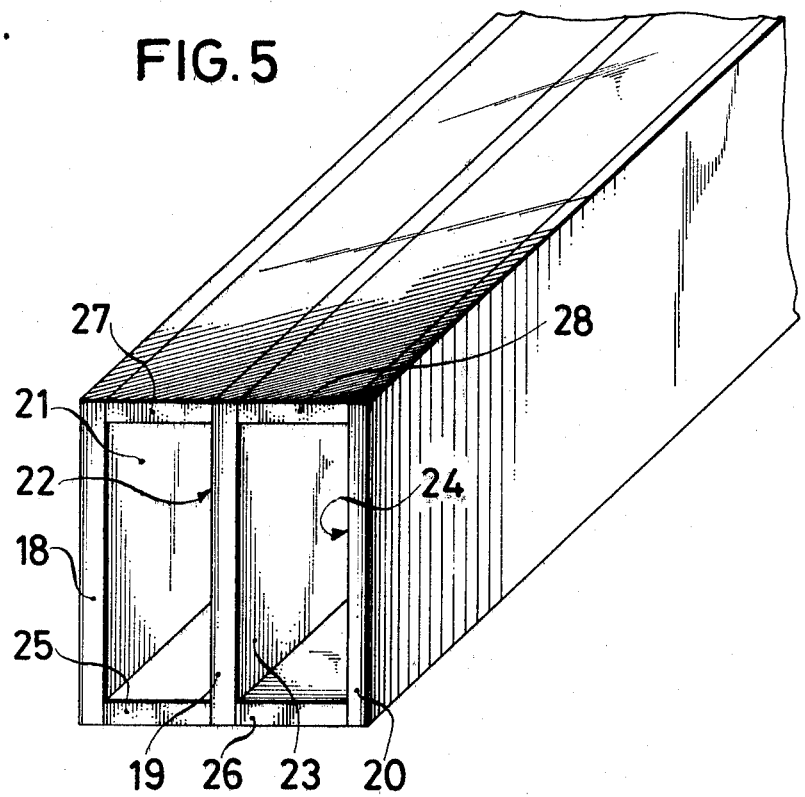
FIG. 5 is a fragmentary perspective view illustrating the construction of one of the reflectors according to the invention.

Coming now to FIG. 5 it will be seen that this illustrates in detail the construction of the reflectors. It should be understood that this construction is preferred for all of the reflectors 5, 6, 10, 13, 15 which have been discussed hereinbefore. As shown in FIG. 5 each reflector may be composed of e.g. three sheet metal members 18, 19 and 20 which are arranged with spacing from one another so as to extend in parallelism. The juxtaposed surfaces 21, 22 and 23, 24 have a high heat reflecting capability. The outermost sheet metal member 20, i.e. the one which when the reflector is installed will face towards the hot steel strip 2, should be relatively thin so that its heat absorption capability is as small as possible. The other members 18 and 19 can be thicker in order to improve the structural strength and stability of the reflector.

The members 18–20 are mounted in a (not shown in detail) frame which includes inter alia the frame members 25, 26, 27 and 28. Preferably, the connection between the members 18–20 and the members 25–28 and other members of the frame is such that no dust or other contaminents can enter into the space surrounded by the members 18–20 and 25–28 because this would detract from the effectiveness of the reflector. Also, the members 25–28 are preferably of material having as little thermal conductivity as possible and overall the reflectors should have as little thermal conductivity with reference to radiation and convection, as possible.

Detectors 3, 4, 9 are scanning temperature measuring elements, as described by F. Bohländer, "Stahl und Eisen" 97 (1977) pages 927-932.

The shifting members 7 and 8 are elements whose position is controlled by conventional pressure cylinders.

The surfaces 21, 22, 23, 24 of sheet metal members 18, 19, 20 must have high reflecting characteristics, so that a large part of the heat radiation emitted from the hot sheet metal member is reflected back on the member. The relationships are described by the known laws of radiation (of Stephan-Boltzman and Kirchhoff).

The frame members 25 to 28 are made of material (for example, asbestos) having low thermal conductivity, so that there is no heat conduction within the covering and therefore no heat losses are incurrred.

The present invention makes it possible, by controlled partial covering of the marginal edges of the hot steel strip, to obtain a uniform or a substantially uniform temperature distribution over the length and width of the steel strip in a particularly simple and highly economical manner. It prevents the otherwise inherently stronger cooling of the edge portions of the strip and overall results in a reduced heat radiation and thus reduced lower temperature. Moreover, it avoids the problems which result from subjecting the reflectors to excessive thermal stresses not only effective for the intent of purpose but requires little maintenance.

What is claimed is:

1. Apparatus for effecting uniform temperature distribution over the width of a hot steel strip during rolling, said strip having a center portion and lateral edge portions and traveling from an initial treating station to a subsequent treating station, comprising means for advancing the hot steel strip in a predetermined path linking said stations; and means for partially covering the lateral edge portions of the steel strip; said covering means comprising heat reflectors arranged to surround said edge portions laterally at a predetermined distance from said edge portions, and toward the center of said strip by a distance equal to substantially half said predetermined distance; said reflectors being configurated to resemble portions of a conical section, and having center points located in the region of said lateral edge portions; said portions of conical sections being segments of ellipses, said predetermined distance being equal to the median value of the semi-axes of the ellipses, so that cooling of the edge of the strip is controlled to produce uniform temperature over the total width of the strip.

2. Apparatus as defined in claim 1, said reflectors comprising a plurality of elongated members each having a predetermined shape, said members being spaced apart and thereby defining gaps there between and being arranged on an arc having a center which is spaced from a respective lateral edge portion toward the center of the strip by a distance equal to about one-quarter of said distance between said edge portion and the center of said strip.

3. Apparatus as defined in claim 2, said predetermined shape being planar.

4. Apparatus as defined in claim 2, said predetermined shape being arcuate.

5. Apparatus as defined in claim 1, said reflectors each having a portion laterally of a respective edge of the steel strip, said portions being planar and lines normal to them intersecting the respective edge of said steel strip, and said reflectors also having portions upwardly of the respective edge and of elliptical shape, all said portions being located on a circular arc.

6. Apparatus as defined in claim 1; and further comprising means for adjusting said reflectors relative to said strip to compensate for different strip widths.

7. Apparatus as defined in claim 1; and further comprising means for laterally withdrawing said reflectors from said path.

8. Apparatus as defined in claim 1, each of said reflectors being longitudinally subdivided into a plurality of spaced sections.

9. Apparatus as defined in claim 8; and further comprising strip-sensing detectors arranged in the gaps between respective ones of said sections.

10. Apparatus as defined in claim 8; and further comprising heating means for heating said lateral edge portions.

11. Apparatus as defined in claim 10, said heating means being arranged in gaps between respective ones of said sections.

12. Apparatus as defined in claim 10, said reflectors having downstream ends as considered with reference to the direction of strip travel, said heating means being arranged at said downstream ends.

13. Apparatus as defined in claim 1, said reflectors having a low heat-absorption capacity and each being composed of a plurality of sheet-metal members which are arranged parallel to and at a distance from one another and mounted in a frame, juxtaposed inner surfaces of said members having high heat reflecting capability and the respective sheet-metal member which faces toward the steel strip being relatively thin.

* * * * *